United States Patent
Freeth et al.

(10) Patent No.: US 10,532,821 B2
(45) Date of Patent: Jan. 14, 2020

(54) FLUID SYSTEM HAVING A CONTROL VALVE AND A MONITORING SYSTEM THEREFOR

(71) Applicant: Eaton Corporation, Cleveland, OH (US)

(72) Inventors: Gilbert P. Freeth, San Dimas, CA (US); Parag More, Kothrud Pune (IN); Robert Sbonek, Grove, CA (US); Jaspal Rawat, Irvine, CA (US); Harshad P. Pawale, Maharashtra (IN); Chandrashekhar Nehete, Pune (IN); Vikas Pandey, Pune (IN); Balakrishnan Arumugam, Pune (IN); Rajan Y. Tribhuvan, Pune (IN); Bhupesh Jingar, Pune (IN); Rohit Gupta, Pune (IN)

(73) Assignee: Eaton Intelligent Power Limited, Dublin (IE)

(*) Notice: Subject to any disclaimer, the term of this patent is extended or adjusted under 35 U.S.C. 154(b) by 29 days.

(21) Appl. No.: 15/802,972

(22) Filed: Nov. 3, 2017

(65) Prior Publication Data

US 2018/0127109 A1 May 10, 2018

Related U.S. Application Data

(60) Provisional application No. 62/456,239, filed on Feb. 8, 2017, provisional application No. 62/417,526, filed on Nov. 4, 2016.

(51) Int. Cl.
*G05D 7/00* (2006.01)
*G05D 11/00* (2006.01)
(Continued)

(52) U.S. Cl.
CPC ............. *B64D 37/16* (2013.01); *B64F 1/28* (2013.01); *G05D 16/2097* (2019.01);
(Continued)

(58) Field of Classification Search
CPC ............ B64D 37/16; B64F 1/28; F16K 17/04
(Continued)

(56) References Cited

U.S. PATENT DOCUMENTS 5,153,522 A  10/1992  Sano
5,660,198 A  8/1997  McClaran
(Continued)

FOREIGN PATENT DOCUMENTS

WO  2015123296 A3  10/2015

*Primary Examiner* — Md Azad
(74) *Attorney, Agent, or Firm* — Fishman Stewart PLLC

(57) ABSTRACT

A fluid system includes a controller, a control valve, and a fluid manifold. A first solenoid may be connected to the fluid manifold, the control valve, and/or the controller. A second solenoid may be connected to the fluid manifold, the control valve, and/or the controller. A first pressure sensor may be in fluid communication with an output of the control valve. A second pressure sensor may be in fluid communication with the fluid manifold. The controller may be configured to control operation of the control valve via the first solenoid and the second solenoid according to a first fluid pressure obtained via the first pressure sensor and according to a second fluid pressure obtained via the second pressure sensor.

19 Claims, 15 Drawing Sheets

(51) Int. Cl.
   *B64D 37/16*    (2006.01)
   *B64F 1/28*     (2006.01)
   *G05D 16/20*    (2006.01)
   *F16K 31/06*    (2006.01)
   *F16K 17/04*    (2006.01)
   *B64D 45/00*    (2006.01)

(52) U.S. Cl.
   CPC .............. *B64D 45/00* (2013.01); *F16K 17/04* (2013.01); *F16K 31/0679* (2013.01)

(58) Field of Classification Search
   USPC ........................................................ 700/282
   See application file for complete search history.

(56) References Cited

U.S. PATENT DOCUMENTS

| | | |
|---|---|---|
| 6,917,203 B1 | 7/2005 | Perotti et al. |
| 8,757,193 B2* | 6/2014 | Lauderdale ............. E21B 34/10 137/119.03 |
| 2006/0068969 A1* | 3/2006 | Bartsch ............... F16H 61/0206 477/34 |
| 2009/0000672 A1* | 1/2009 | Goll ................... G05B 19/0421 137/487.5 |
| 2011/0010067 A1* | 1/2011 | Rubenbauer ............ B60T 8/172 701/70 |
| 2011/0061749 A1* | 3/2011 | Okamoto ............ F16K 31/0655 137/492.5 |
| 2014/0129038 A1* | 5/2014 | Finnell ................. G05D 7/0629 700/283 |

* cited by examiner

FLUID SYSTEM HAVING A CONTROL VALVE AND A MONITORING SYSTEM THEREFOR

CROSS-REFERENCE TO RELATED APPLICATIONS

This application claims the benefit of U.S. Provisional Patent Application Ser. No. 62/417,526, filed on Nov. 4, 2016, and U.S. Provisional Patent Application Ser. No. 62/456,239, filed on Feb. 8, 2017, the disclosures of which are hereby incorporated herein by reference in their entireties.

TECHNICAL FIELD

The present disclosure generally relates to fluid systems, including fluid fuel systems that may be used with aircraft and/or vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Existing fluid systems that may, for example, be used in aircraft refueling applications, may not effectively monitor and/or control fuel pressure during refueling of an aircraft or vehicle.

In some circumstances, fluid systems may include built-in test (BIT) functionality, which may be configured to monitor the health/performance of one or more components of the fluid systems. Such systems may include Prognostics and Health Management (PHM) functionality. Existing BIT systems may not effectively monitor and/or predict failures.

There is a desire for solutions/options that minimize or eliminate one or more challenges or shortcomings of fluid systems. The foregoing discussion is intended only to illustrate examples of the present field and should not be taken as a disavowal of scope.

SUMMARY

In embodiments, a fluid system may include a controller; a control valve; a fluid manifold; a first solenoid that may be connected to the fluid manifold, the control valve, and/or the controller; a second solenoid that may be connected to the fluid manifold, the control valve, and/or the controller; a first pressure sensor in fluid communication with an output of the control valve; and/or a second pressure sensor in fluid communication with the fluid manifold. The controller may be configured to control operation of the control valve via the first solenoid and the second solenoid according to a first fluid pressure obtained via the first pressure sensor and according to a second fluid pressure obtained via the second pressure sensor.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
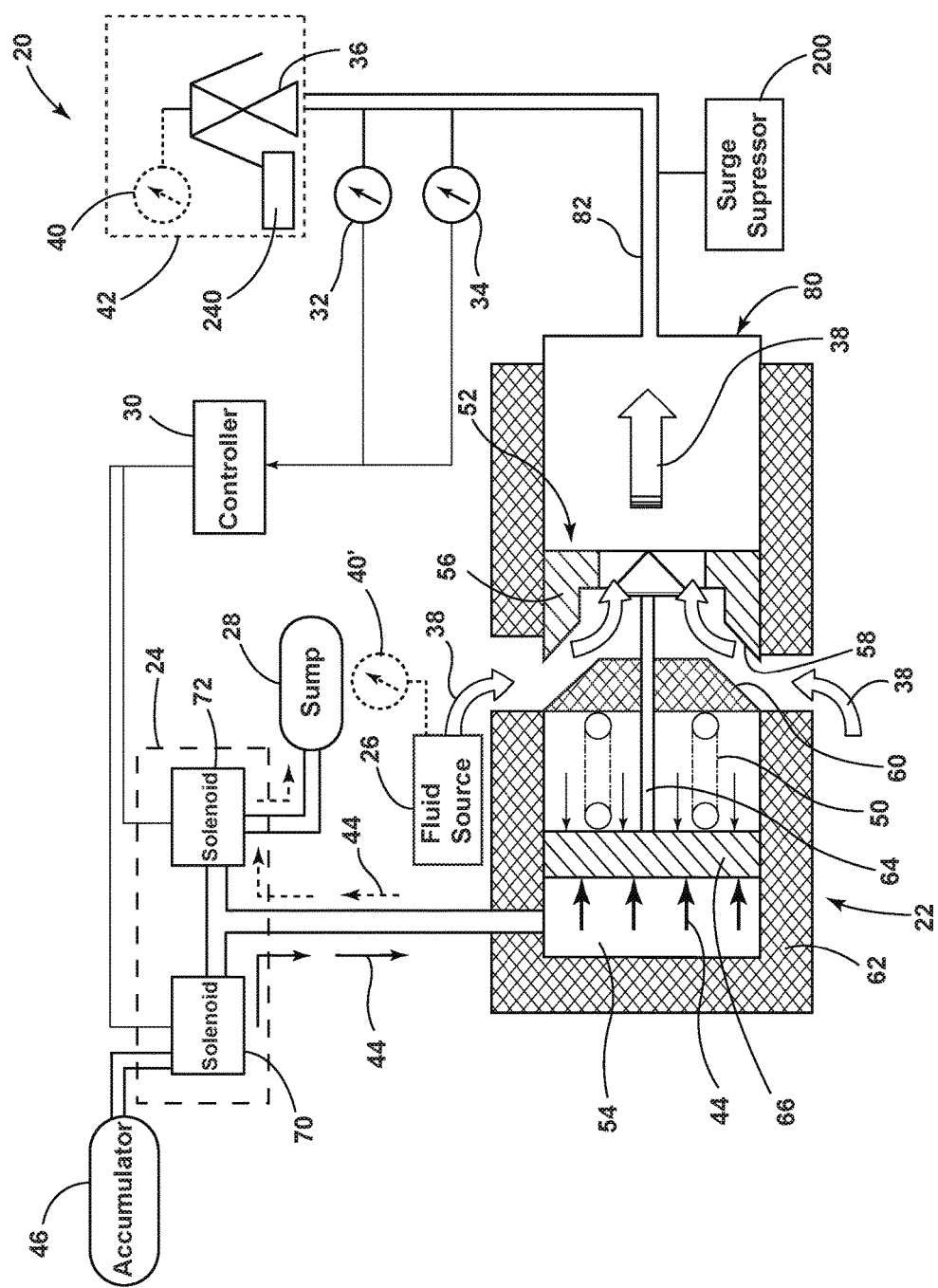
FIGS. 1 and 2 are schematic views generally illustrating embodiments of fluid systems.
Figure 2:
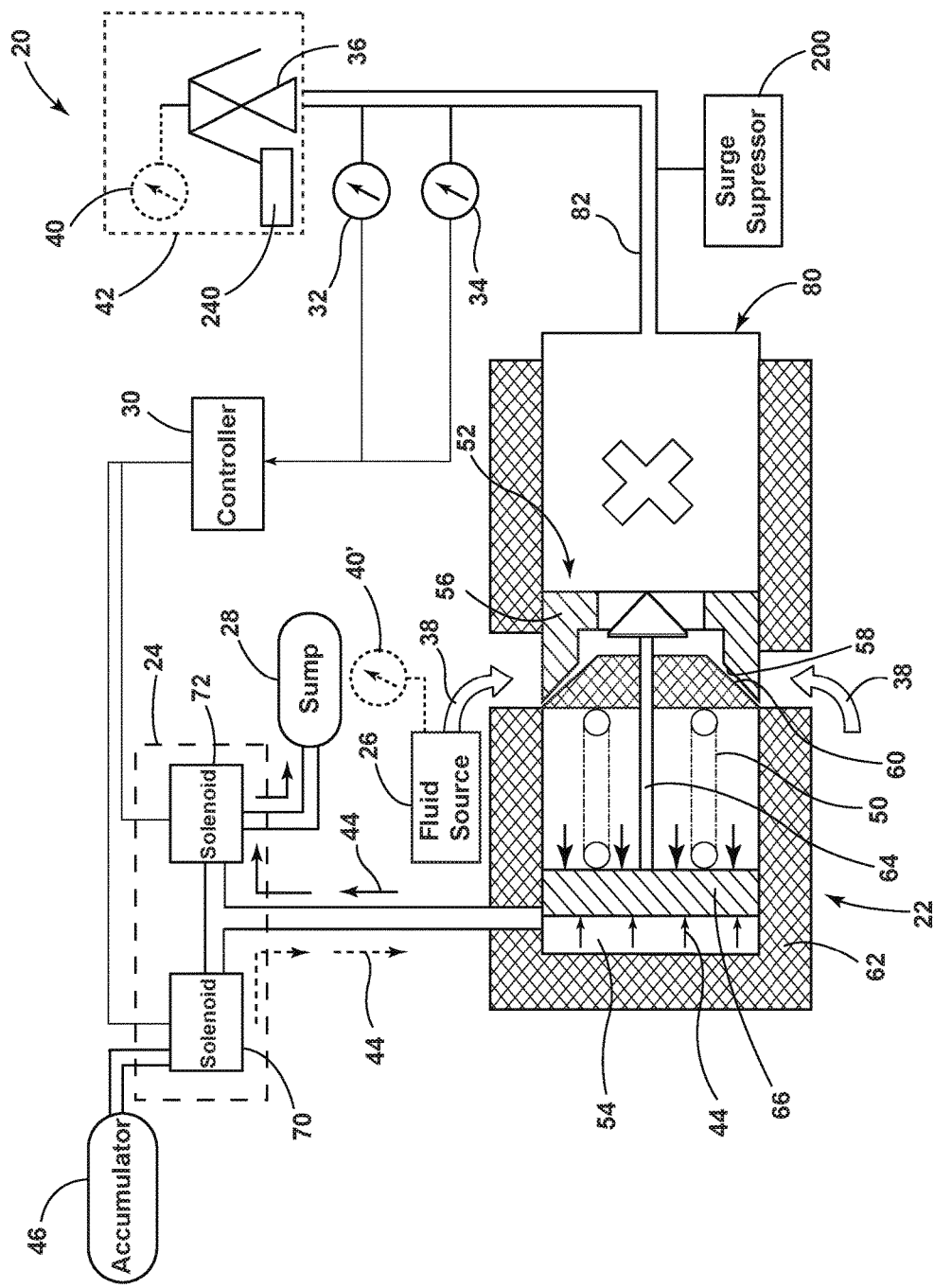

In embodiments, such as generally illustrated in FIGS. 1 and 2, a fluid system 20 may include a control valve 22, a manifold block 24, a system fluid source 26, a sump 28, a controller 30, a pressure sensor 32, a flow meter 34, and/or a fluid output 36. The controller 30 may be configured to control flow of system fluid 38 from the fluid source 26 to the fluid output 36. A fluid source 26 may include, for example and without limitation, a fuel truck or hydrant. A fluid output 36 may include, for example and without limitation, an underwing nozzle of an aircraft 42.

Figure 3:
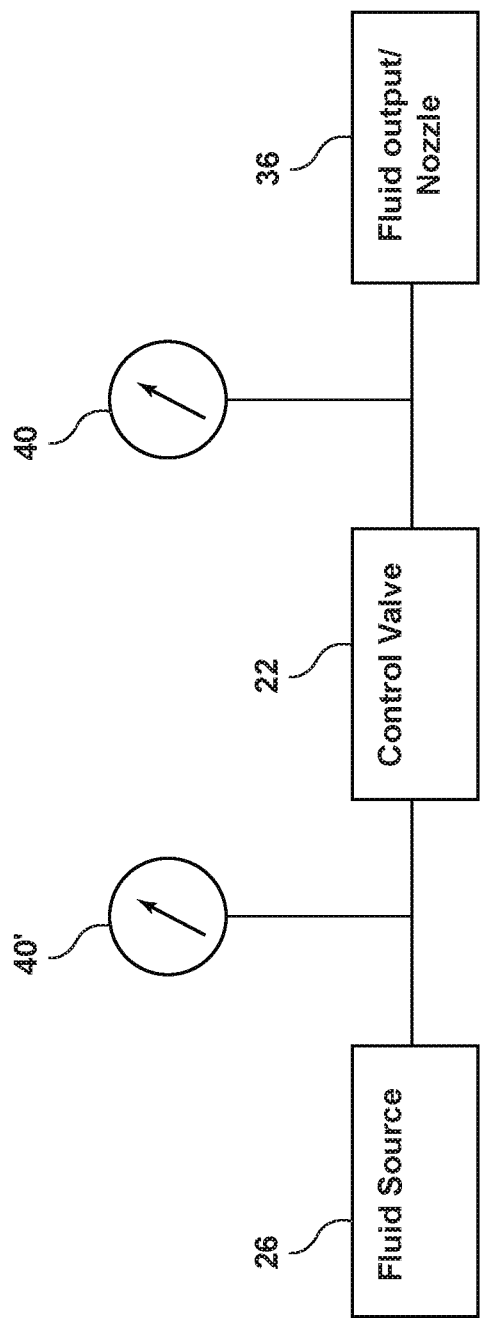
FIG. 3 is a schematic view generally illustrating an embodiment of a fluid system.

With embodiments, such as generally illustrated in FIG. 3, a controller 30 may be programmed for one or more specific fluid flow applications, such as via calibration. Calibration may include directly measuring fluid pressure and/or fluid flow rate at or about a fluid source 26 (e.g., an accumulator, a coupler, etc.) and/or the fluid output 36, such as via a pressure sensor 40 (e.g., a calibration pressure transducer) that may be connected at or about the fluid output 36, during simulated operation and/or a pressure sensor 40' (e.g., a second calibration pressure transducer) that may be connected between the fluid source 26 and the control valve 22. From these measurements and a known/expected density of the system fluid 38 (e.g., fuel), a system flow coefficient CV may be calculated. The flow coefficient CV may be provided to and/or programmed into the controller 30, and the calibration pressure sensor 40 may be disconnected from the fluid system 20. A controller 30 may control fluid flow in a fluid system 20 according to a pressure sensed via the pressure sensor 32, a fluid flow value sensed by the flow meter 34, and/or a flow coefficient CV.

With embodiments, the control valve 22 may include a normally-closed configuration and/or may be biased closed by a biasing member 50 (e.g., a spring). The control valve 22 may include a piston 52 that may be movable within the control valve 22 to selectively allow system fluid 38 to flow through the control valve 22. The piston 52 may be actuated via control fluid 44 (e.g., high pressure hydraulic fluid) being provided to a control or fluid chamber 54 of the control valve 22. If the control fluid 44 is of a sufficiently high pressure to overcome the force of the biasing member 50, the piston 52 may move to at least partially open the control valve 22. The piston 52 may include an open-webbed configuration that may include an outer portion/sleeve 56 with a rear edge 58 that may be configured to engage a valve seat 60 of a control valve body 62 to prevent flow of the system fluid 38. A piston stem 64 may extend rearward (e.g., toward the control chamber 54) from the outer portion 56 within the control valve body 62 to a shoulder 66 of the piston 52. The biasing member 50 may act on the shoulder 66 to bias the piston 52 to a closed position.

In embodiments, a controller 30 may be configured to control (e.g., via PWM signals) operation of one or more solenoids that may be connected to and/or included with the manifold block 24. The one or more solenoids may control flow of the control fluid 44 between a control fluid source 46 (e.g., an accumulator), the sump 28, and the control valve 22. For example and without limitation, a fluid system 20 may include a first solenoid 70 that may include a normally-closed configuration and may control flow of control fluid 44 (e.g., high pressure control fluid flow) from the control fluid source 46 to the control chamber 54 of the control valve 22, such as to open the control valve 22. A fluid system 20 may include a second solenoid 72 that may include a normally-open configuration and may control flow of control fluid 44 from the control chamber 54 to a sump 28, such as during closing of the control valve 22. The first solenoid 70 and/or the second solenoid 72 may be configured such that upon a loss of power, the control valve 22 will close.

With embodiments, a control valve 22 may selectively permit and restrict the flow of system fluid 38 to the fluid output 36 (e.g., to a nozzle). The pressure transducer 32 and the flow meter 34 may be configured to sense a pressure and/or a flow value. For example and without limitation, the pressure transducer 32 and the flow meter 34 may be in fluid communication with an output 80 of the control valve 22, upstream of the fluid output 36, such as along a hose or other fluid conduit 82 that may connect the control valve output 80 to the fluid output 36. The controller 30 may control the fluid system 20 according to outputs from the pressure transducer 32 and/or the flow meter 34. For example and without limitation, the controller 30 may be configured to determine or derive a fluid pressure at the fluid output 36 according to the fluid pressure sensed by the pressure transducer 32 and/or the fluid flow sensed by the flow meter 34, one or both of which may be connected to fluid system 20 at a distance from the output 80 of the control valve 22 and/or at a distance from the fluid output 36.

In embodiments, to permit system fluid 38 to flow to the fluid output 36, a controller 30 may actuate the first solenoid 70 to an open position and/or may actuate the second solenoid 72 to a closed position. The control fluid 44 may flow from the control fluid source 46 to the control chamber 54 of the control valve 22 and, if the pressure of the control fluid 44 is great enough to overcome the force provided by a biasing member 50 of the control valve 22, the control fluid 44 may cause a piston 52 of the control valve 22 to move from a closed position in which system fluid 38 may not be permitted to flow (e.g., as generally illustrated in FIG. 1) to an open position in which system fluid 38 may flow (e.g., as generally shown in FIG. 2). The controller 30 may control the first and second solenoids 70, 72 to modulate a fluid pressure in the control chamber 54, which may modulate the piston 52 of the control valve 22 to increase or decrease downstream pressure of system fluid 38 (e.g., at the fluid output 36).

Figure 4:
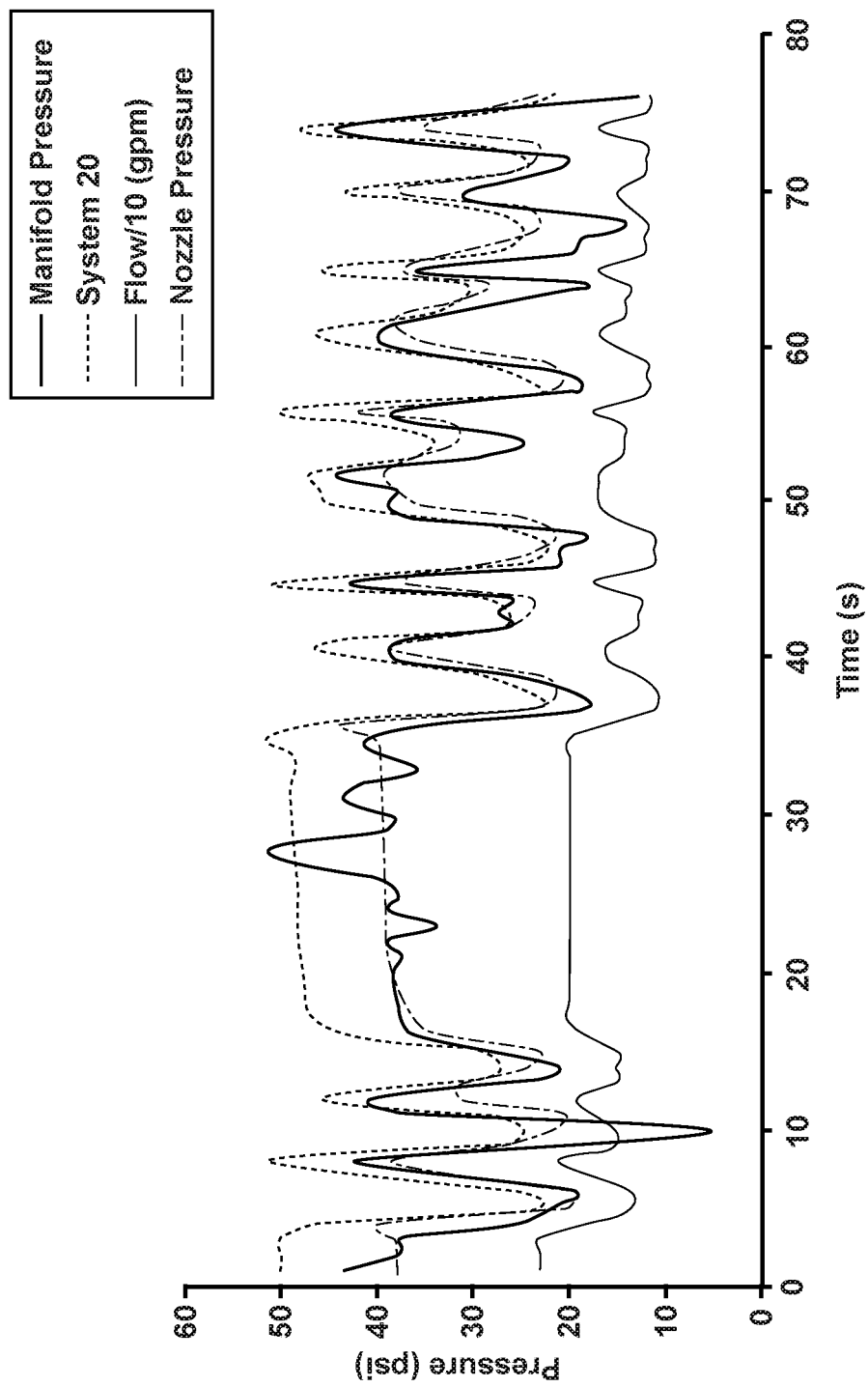
FIG. 4 is a graphical representation generally illustrating a relationship between fluid pressure measurements at a plurality of locations in a fluid system relative to time.

In embodiments, such as generally illustrated in FIG. 4, if the fluid output 36 of the fluid system 20 becomes blocked suddenly/quickly (e.g., if a manifold/fuel valve of an aircraft fuel tank is closed) or if backpressure at the fluid output 36 rises, the controller 30 may attempt to continue to control fluid flow and fluid pressures in the fluid system 20, but the fluid pressures may continue to oscillate between high and low pressures until the blockage at the fluid output 36 is removed (see, e.g., starting at about 35 seconds). This effect may be especially prevalent in low flow situations. For example and without limitation, if the piston 52 of the control valve 22 is close to the valve seat 60, a relatively small opening may allow system fluid 38 to pass through the control valve 22 and even a small movement of the piston 52 may result in a large percentage change in the flow area, which may result in relatively large and/or sudden changes in pressure and/or flow. The controller 30 may sense such large changes and attempt to compensate by opening or closing the control valve 22, which may result in fluctuations in pressure at the fluid output 36.

Figure 5:
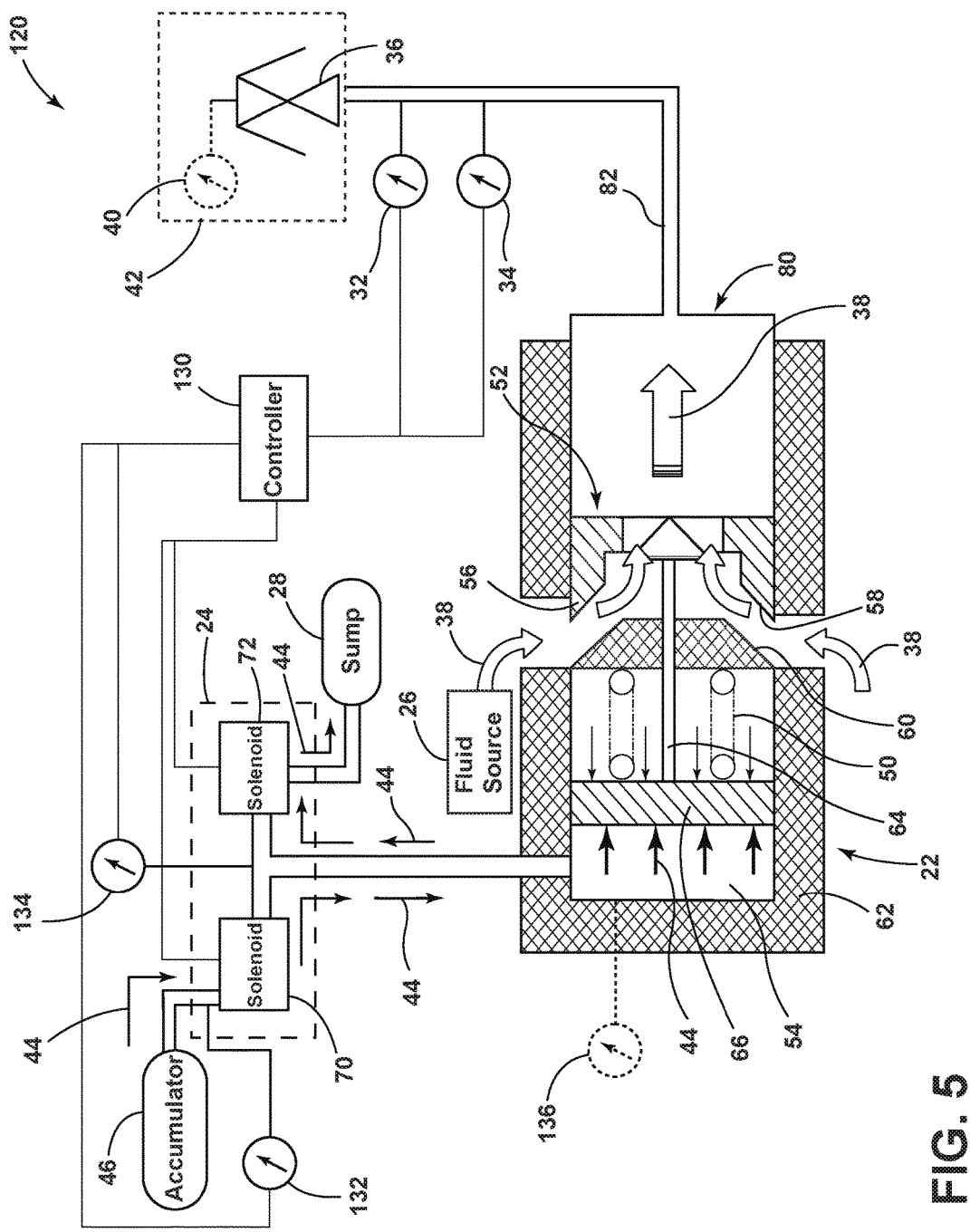
FIG. 5 is a schematic view generally illustrating an embodiment of a fluid system according to teachings of the present disclosure.

In embodiments, such as generally illustrated in FIG. 5, a fluid system (e.g., fluid system 120) may include a configuration similar to fluid system 20 and/or may include a second pressure transducer 132, a third pressure transducer 134, and/or a fourth pressure transducer 136, some or all of which may be connected to a controller 130 (e.g., via wired and/or wireless connections). The second pressure transducer 132 may be configured to sense (e.g., monitor, determine, measure, etc.) a pressure of a control fluid 44 at or about a control fluid source 46. The third pressure transducer 134 may be configured to sense a pressure of the control fluid 44 in the manifold block 24. The manifold block 24 may be in fluid communication with a first solenoid 70 and/or with a second solenoid 72. The fourth pressure transducer 136 may be configured to sense a pressure of the control fluid 44 in the control chamber 54 of a control valve 22. The fourth pressure transducer 136 may be configured for calibration. For example and without limitation, pressure measured in the control chamber 54 via the fourth pressure transducer 136 may be compared to pressure measured in the manifold block 24 via the third pressure transducer 134. If there is a difference in pressure (e.g., due to losses from the connection between the manifold block 24 and the control valve 22), the controller 130 may use and/or compensate for the difference in controlling the flow of control fluid 44 and/or the pressure difference may be incorporated into a flow coefficient CV. The fourth pressure transducer 136 may or may not be connected during normal operation (e.g., other than during calibration).

With embodiments, calibration may include modulating the first and second solenoids 70, 72 and measuring the actual change in control fluid pressure in the control chamber 54 via the fourth pressure transducer 136. The measured pressure(s) may be compared to expected pressure(s) to determine, at least in part, a flow coefficient CV. Differences between the measured pressure(s) and the expected pressure(s) may correspond to friction forces of seals and/or other variability related to the control chamber 54. The flow coefficient CV may be provided to/stored in the controller 130 for controlling fluid flow in the fluid system 120.

In embodiments, a controller (e.g., controller 130) may be configured to determine a position of the control valve 22, such as a position of the piston 52). The area on which control fluid pressure acts (e.g., a surface area of the shoulder 66) may be known and stored in the controller 130, and the controller 130 may be configured to determine the force acting on the piston 52 due to pressure in the control chamber 54. The characteristics of a biasing member 50 may be programmed/received into the controller 130, such as spring length and spring constant/stiffness.

With embodiments, a controller 130 may include and/or may be configured to determine or obtain a control chamber pressure, the piston area, friction forces (e.g., the flow coefficient CV), and/or the spring constant, which may allow the controller 130 to determine a spring deflection according to the following equations:

$$\text{Forces due to control chamber pressure} + \text{Friction Forces} = \text{Spring Force acting on Inner Piston} \quad \text{Eq. 1}$$

$$(\text{Control Chamber Pressure} * \text{Inner Piston Area}) + \text{Friction Forces} = (\text{Spring Constant} * \text{Spring Deflection}) \quad \text{Eq. 2}$$

$$\frac{(\text{Control Chamber Pressure} * \text{Inner Piston Area}) + \text{Friction Forces}}{\text{Spring Constant}} = \text{Spring Deflection} \quad \text{Eq. 3}$$

For example and without limitation, spring deflection may equal a product of control chamber pressure and inner piston area plus friction forces, divided by a spring constant. The controller 130 may be configured to determine a piston position (e.g., relative to a closed position) according to the following equation:

$$\text{Spring Length} - \text{Spring Deflection} = \text{Piston Position} \quad \text{Eq. 4}$$

For example and without limitation, piston position may equal a difference between a spring length and spring deflection. In embodiments, a controller 130 may be configured to control fluid flow in the fluid system 120, at least in part, according to the determined piston position. For example and without limitation, a desired change in fluid pressure at a fluid output 36 may be a function of the pressure measured via the first pressure sensor 32, fluid flow measured via flow meter 34, system losses (e.g., flow coefficient CV), and the change in valve opening area:

$$\Delta \text{ Nozzle Pressure} = f^n \{\text{Pressure }(P1), \text{Flow }(Q), \text{System Losses}, \Delta \text{ Valve Opening Area}\} \quad \text{Eq. 5}$$

The change in valve opening area may be a function of the change in piston position, and the change in piston position may be a function of the change in solenoid modulation:

$$\Delta \text{Valve Opening Area} = f^n \{\Delta \text{ Piston Position}\} \quad \text{Eq. 6}$$

$$\Delta \text{Piston Position} = f^n \{\Delta \text{ Solenoid Modulation}\} \quad \text{Eq. 7}$$

Figure 6:
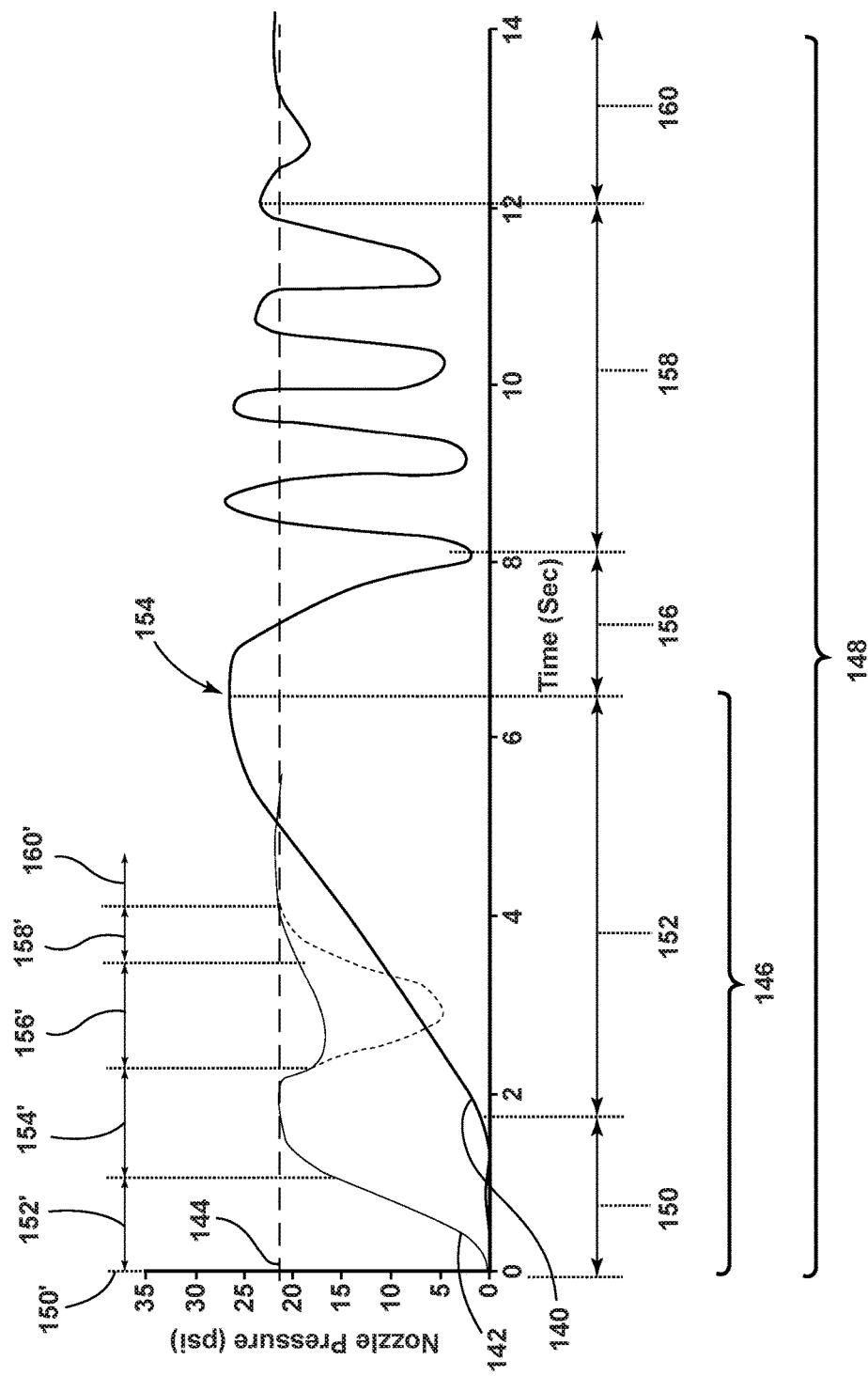
FIG. 6 is a graphical representation generally illustrating a relationship between nozzle pressure measurements in two embodiments of fluid systems relative to time.

With embodiments, such as generally illustrated in FIG. 6, based on the above relationships, the controller 130 may modulate the first and second solenoids 70, 72 to more accurately control pressure at the fluid output 36 (e.g., a nozzle pressure). The controller 130 may, additionally or alternatively, determine the speed at which the piston 52 should move to increase or decrease control valve output pressure and/or the pressure at the fluid output 36. The controller 130 may be configured (e.g., based on the above) to more precisely modulate the first and second solenoids 70, 72, which may allow for desired output pressures to be more easily reached and/or maintained, regardless of flow and pressure conditions.

With embodiments, a fluid system 120 may be configured for use with one or more of a variety of applications. For example and without limitation, a fluid system 120 may be configured for use with a fluid output 36 that may include a spring-loaded manifold in which the aircraft valve(s) opens when the nozzle is engaged and opened, and/or that may include solenoid-actuated manifolds in which the aircraft valve(s) open automatically when certain pressure threshold limits are reached at the aircraft tank inlet and the manifold is commanded to open to start refueling.

Referring still to FIG. 6, the first line 140 generally represents performance of an embodiment of a first fluid system 20 and the second line 142 generally represents performance of an embodiment of a second fluid system 120. In an initial state of the first fluid system 20, the controller 30 may not be certain of the position of the piston 52 and a delay before the piston 52 actually starts to move and the control valve 22 actually starts to open. Once the control valve 22 starts to open, an opening time 150 may be a user-configurable parameter that may determine the opening modulation 152 for at least the first solenoid 70. In some circumstances, the controller 30 may not permit a full open condition to be set as the opening modulation. Once flow is detected, such as by flow meter 34, the fluid system 20 may exit the initial state and/or the controller 30 may stop providing the opening modulation to the first solenoid 70. In some circumstances, the flow meter 34 may include a turbine flow meter which may give a false or misleading indication of instantaneous flow, which may cause the fluid system 20 to exit the initial state/modulation 152 earlier than may be desired and pre-set hardcoded values may be used for further fluid flow management. Additionally or alternatively, such as generally illustrated in section 146, if the fluid output 36 is connected to or includes a spring-loaded manifold, fluid pressure at the fluid output 36 may rise during with the initial modulation 152 until a certain or set pressure 144 is reached. Once the certain or set pressure 144 is reached, a spring-loaded manifold may open and normal refueling 160 may continue (e.g., the opening of the spring-loaded manifold may reduce the fluid pressure).

In embodiments, such as generally illustrated in section 148, if the fluid output 36 is connected to or includes a solenoid-operated manifold, the manifold may not open until a certain pressure 144 (e.g., a desired or set pressure) is reached and maintained for a threshold waiting time. In some instances, fluid pressure in the fluid system 20 may continue to build with the opening modulation 152 toward the certain pressure 144, but may continue to build after that certain pressure is reached because, unlike a spring-loaded manifold, the solenoid-operating manifold may not open until after the threshold waiting time has elapsed. During the threshold waiting time, pressure in the fluid system 20 may continue to build and may reach an overpressure condition 154. In the event of an overpressure condition, the controller 30 may turn off/close the control valve 22, which may cause a significant pressure drop 156. Several on and off cycles, and corresponding pressure fluctuations 158, may then occur as the controller 30 works to reach and maintain the certain pressure 144 for the threshold waiting time to cause the fluid output 36 (e.g., the aircraft manifold) to open and for refueling 160 to actually begin. Additionally or alternatively, upon opening of the fluid output/aircraft manifold 36, pressure in the fluid system 20 may drop (e.g., in the same or a similar manner as pressure drop 156) and the controller 30 may open the control valve 22 to compensate, but the loss in pressure may cause the aircraft manifold to close, which may also cause one or more pressure fluctuations 158.

With embodiments, in an initial state of the second fluid system 120, the controller 130 may determine that there is no change in piston position, which may indicate that the friction and/or spring forces have not been overcome. When the start of refueling is desired, the controller 130 may fully actuate (e.g., open) the first solenoid 70 to provide maximum control fluid pressure in the control chamber 54, which may more quickly overcome the frictional forces of the piston 52. As soon as the piston 52 begins to move (e.g., as determined/calculated by the controller 130), the controller 130 may reduce the control fluid pressure to control the speed of the piston 52 (see, e.g., period 152'). Once the certain pressure 144 is reached at the fluid output 36, the controller 130 may maintain the piston 52 in generally the same position (see, e.g., period 154'). Additionally or alternatively, the controller 130 may be configured to anticipate the opening of the fluid output/aircraft manifold 36 and the corresponding pressure drop (e.g., during period 156') in the fluid system 120 that the opening may cause. For example and without limitation, the controller 130 may increase control fluid pressure in the control chamber 54 to move the piston 52 enough to increase pressure at the fluid output 36 to maintain a pressure level sufficient to keep the fluid output/aircraft manifold 36 open. As the fluid pressure again approaches the certain pressure 144 (e.g., before the certain pressure is reached), the controller 130 may slow and/or close the control valve 22, at least to some degree (see, e.g., period 158'), which may prevent the certain pressure 144 from being exceeded and/or may limit the degree to which the certain pressure 144 is exceeded and normal refueling 160' may proceed.

In embodiments, the controller 30 of the first fluid system 20 may, for example, and without limitation, close the control valve 22 quickly if it determines that pre-set surge conditions are met. However, the modulation of the first and second solenoids 70, 72 by the controller 30 in the first fluid system 20 may not factor in piston position, so the amount of time required for closing the control valve 22 may vary. With embodiments, the controller 130 of the second fluid system 120 may determine piston position and may use piston position for surge prevention. For example and without limitation, in the second fluid system 120, the controller 130 may determine the modulation to close the control valve 22 according to the piston position (and other parameters), which may more effectively control the surge (e.g., a system fluid source 26 and/or a control fluid source 46 may include an accumulator).

Figure 7:
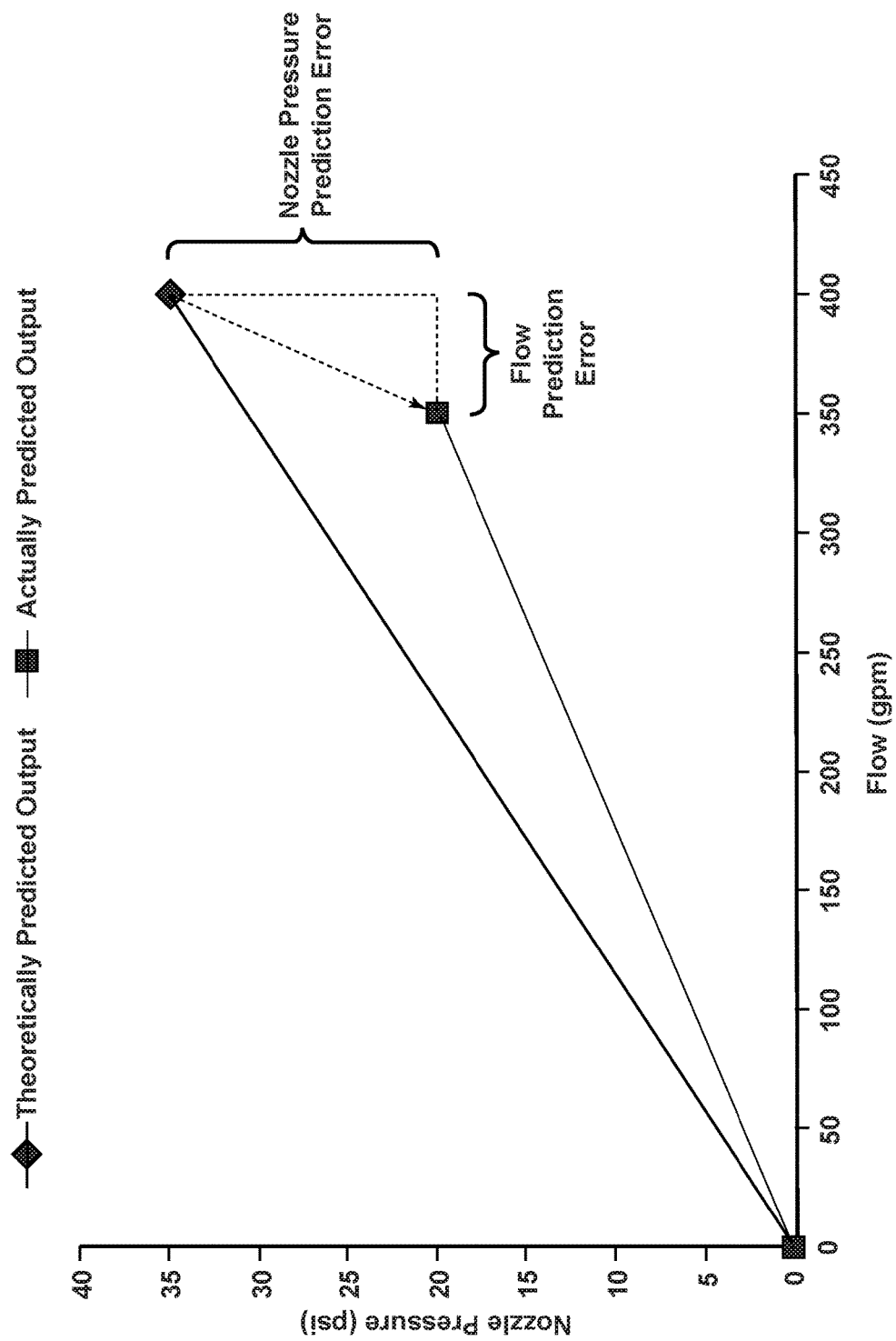
FIG. 7 is a graphical representation generally illustrating a relationship between a predicted fluid pressure and an actual fluid pressure relative to time.

With embodiments, such as generally illustrated in FIG. 7, the controller 130 of fluid system 120 may be configured to compensate for prediction errors. As described above, the controller 130 may calculate and apply a modulation to solenoids 70, 72 to regulate pressure at the fluid output/nozzle 36. In applying a change to the modulation, the controller 130 may predict what should be the change in output/nozzle pressure and flow rate. In some circumstances, applying a changed modulation may not result in the expected out/nozzle pressure and flow, such as because of component wear. The controller 130 may calculate and/or receive a deviation factor for nozzle pressure and/or flow that may be used in calculating subsequent modulations. The controller 130 may be configured to compare two consecutive deviation factors. If the trend of consecutive deviation factors is increasing, the controller 130 may be configured to indicate component wear and/or failure.

In embodiments, fluid systems 20, 120 may be used in connection with hydrant couplers, inline valves, and/or bypass valves. In some designs of inline valves and/or bypass valves, the control fluid 44 may be provided from the same source as the system fluid 38. Such designs may introduce additional variations to a fluid system 20, 120 based on variations in the source. In embodiments in which fluid systems 20, 120 are connected with inline valves and/or bypass valves, such valves may be controlled via an accumulator, which may limit fluid source variations and/or smooth output/nozzle pressure.

Figure 8:
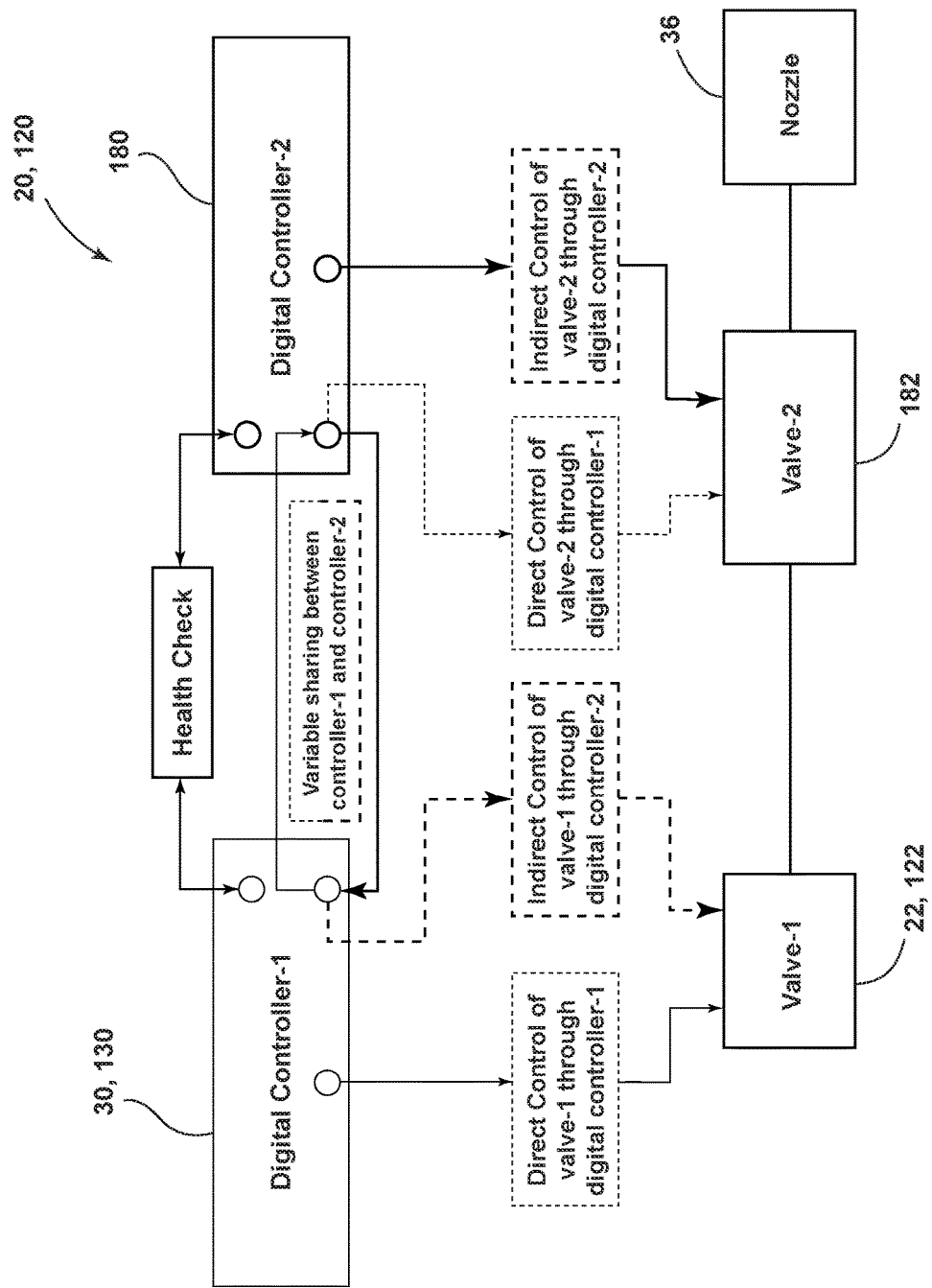
FIG. 8 is a schematic view generally illustrating an embodiment of a fluid system according to teachings of the present disclosure.

With embodiments, such as generally illustrated in FIG. 8, it may be desirable to include one or more redundancies in fluid systems 20, 120. For example and without limitation, fluid systems 20, 120 may include a plurality of controllers (e.g., a first controller 30, 130 and a second controller 180) and/or a plurality of control valves (e.g., a first control valve 22 and a second control valve 182) to control fluid flow to the fluid output/nozzle 36. In the first fluid system 20, a pressure difference (e.g., 10 psi) may be used between the first controller 30 and the second controller 180. As second fluid system 120 may be configured to more accurately control operation of control valves 22, 182, a pressure difference may or may not be used and/or the second controller 180 and second control valve 182 may be linked with the first controller 130 and the first control valve 22.

In a dual configuration of the fluid system 120, each control valve 22, 182 may be nominally associated with (e.g., intended to be directly controlled by) one of the two controllers 30 or 130, 180 may be configured to operate independently from each other. Each controller 30 or 130, 180 may be configured to cross check the health (e.g., anticipated or expected operation and/or performance or functions, life cycle, etc.) of the other controller and may be configured to switch control of the control valves 22, 182 to a single controller if the other controller is malfunctioning. For example and without limitation, during operation, if both controllers are functioning properly, the second controller 180 may communicate variables for the second control valve 182 to the first controller 130, and the first controller 130 may calculate outputs (e.g., solenoid modulations) for both valves 22, 182 and apply those modulations to both valves 22, 182 (e.g., the first controller 130 may directly control the first control valve 22 and the second controller 180 may indirectly control the second control valve 182). Additionally or alternatively, a fluid system 120 may include a reverse configuration, in which the first controller 130 may communicate variables for the first control valve 22 to the second controller 180 and the second controller 180 may calculate outputs for both control valve 22, 182 (e.g., the second controller 180 may directly control the second control valve 182 and the first controller 130 may indirectly control the first control valve 22). If one of the controllers 130, 180 malfunctions or is inoperable for some minor issue, the other controller may control both valves independently of the malfunctioning controller. If one controller completely fails and the valve controlled directly by that controller is inoperable by the other controller, the operating controller may determine and/or receive a health check indication that the other controller has failed and that the operating controller should only control the valve it directly controls.

While illustrated as physically separate, the first controller 130 and the second controller 180 may or may not be physically separate. In embodiments, a controller 30, 130, 180 may include modules (e.g., programming instructions and/or code) to control equipment not related to fluid systems 20, 120. For example, and without limitation, a controller 30, 130, 180 may include various digital inputs and/or digital outputs, which may allow for a single controller system to be converted into/integrated with a dual controller system.

Figure 9:
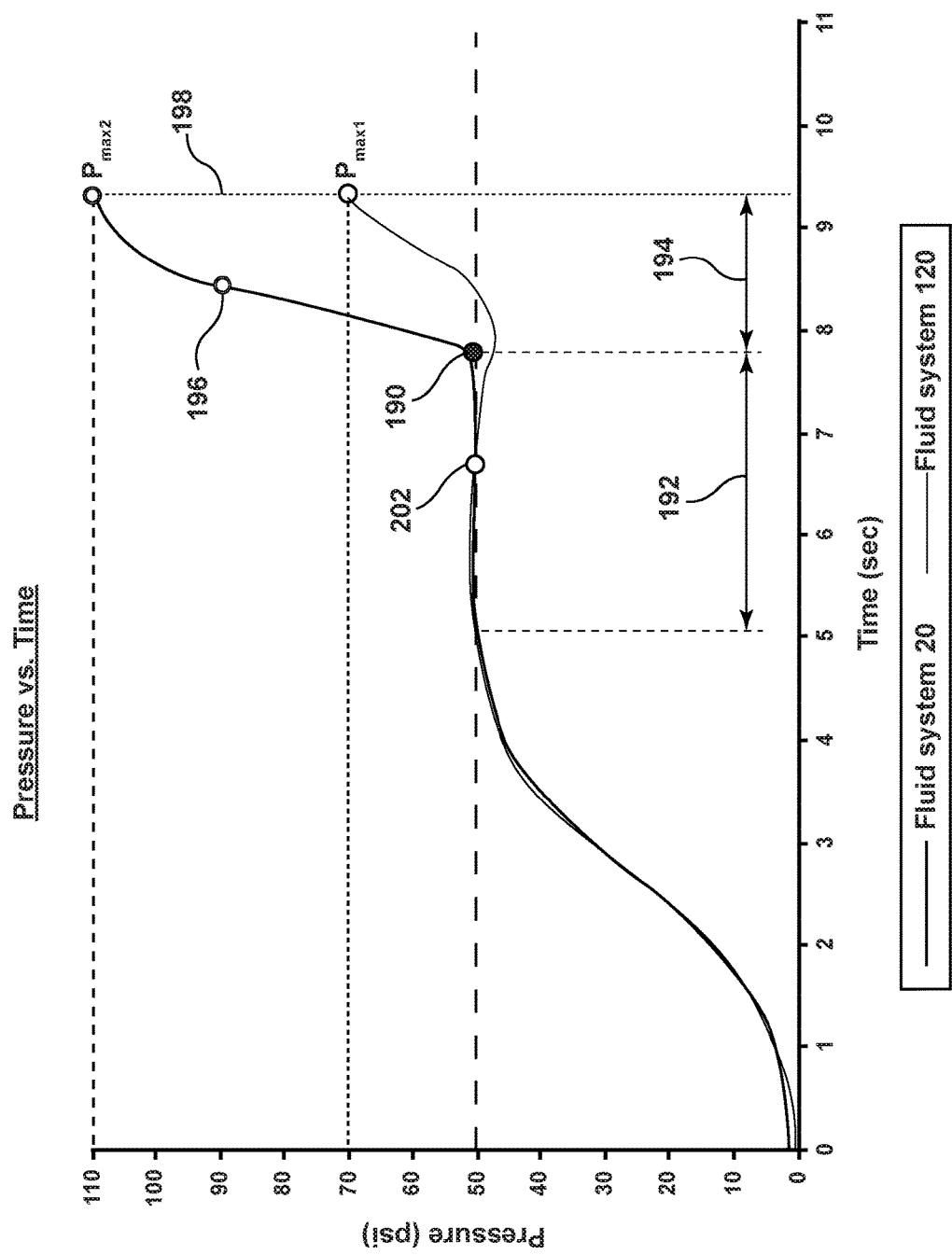
FIG. 9 is a graphical representation generally illustrating fluid pressure measurements of an embodiment of a fluid system according to teachings of the present disclosure and a second fluid system relative to time.
Figure 10A:
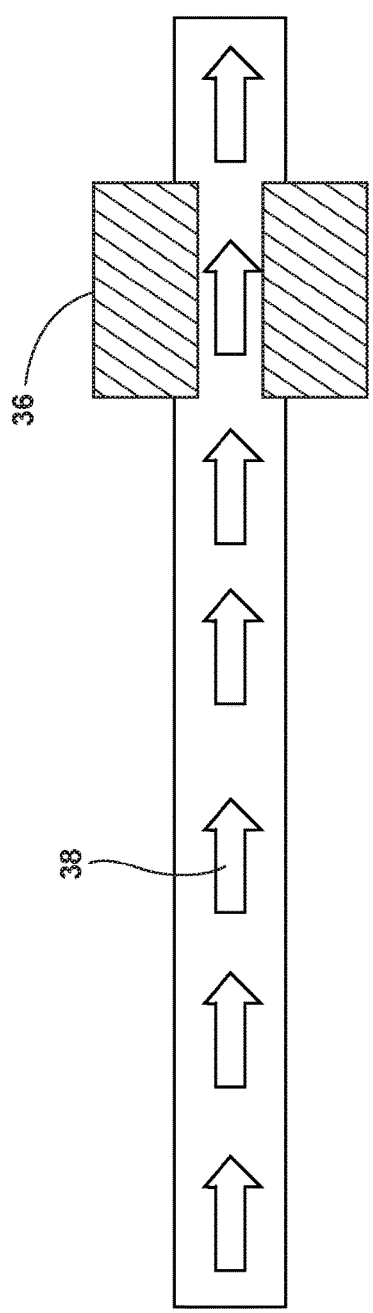
FIG. 10A is a cross sectional view generally illustrating fluid flowing through a fluid conduit and an open fluid output.
Figure 10B:
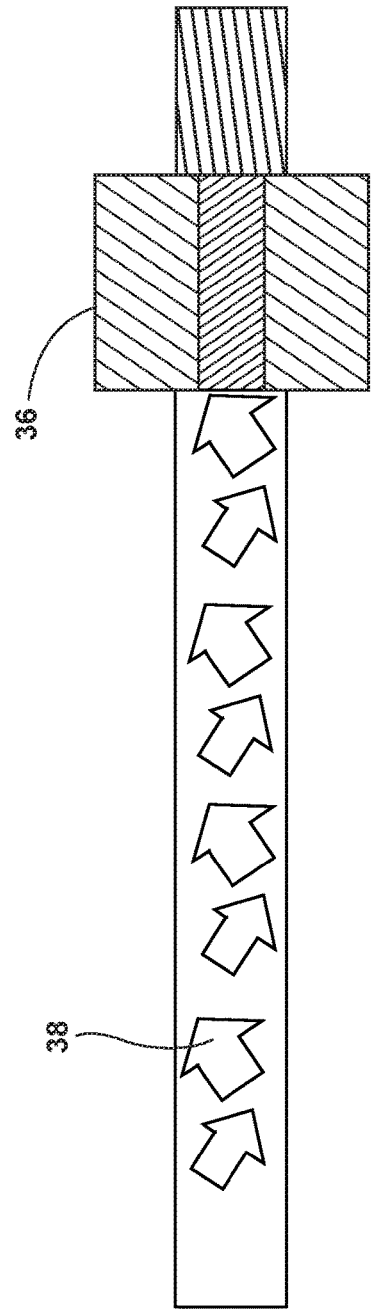
FIG. 10B is a cross sectional view generally illustrating fluid in a fluid conduit after a sudden closing of a fluid output.

In embodiments, a fluid system 20, 120 may experience one or more fluid surges. A fluid surge may include the velocity and/or pressure of fluid suddenly changing, becoming unsteady, or becoming transient, such as generally illustrated in FIGS. 9, 10A, and 10B. During a surge, fluid may travel at high rates and/or pressures, which may damage system components.

Surges may occur for one or more of a variety of reasons. For example and without limitation, in some fluid systems, such as first fluid system 20, a surge may occur when a fluid output 36 (e.g., an aircraft manifold or valve) closes, such as upon receiving a signal from the aircraft fuel tank that the tank has been filled with the desired amount of fuel. Prior to the closing of the aircraft manifold at point 190, fluid pressure may be maintained at a substantially constant level during a normal refueling period 192. Once the fluid output/manifold 36 closes, a pressure transducer 32 may detect a corresponding rise in pressure and/or a rate of pressure rise, and the controller 30 may close the control valve(s) 22 to stop refueling. During a time period 194 that may include time for the pressure transducer 32 to sense the pressure rise, for the pressure transducer 32 to communicate the pressure rise to the controller 30, for the controller 30 to calculate and apply a modulation to the solenoids 70, 72 to close the valve 22 (e.g., at time 196), and for the valve 22 to actually close (e.g., at time 198), the pressure may continue to rise, which may result in relatively high pressures (e.g., a pressure maximum $P_{max1}$) and/or a surge in the fluid system 20. Also, in some circumstances, a relatively long conduit 82 (e.g., a 50-foot hose) may be connected to the control valve 22, and the pressure transducer 32 may be connected relatively close to the control valve 22, so there may be a delay between an increase in pressure at the fluid output/nozzle 36 and detection by the pressure sensor 32, which may also result in relatively high pressures being reached in the fluid system 20. To accommodate for high potential surge pressures, components of fluid systems 20 may include increased structural strength and/or may include multiple and/or larger surge suppressors, all of which add weight and cost to the system. Additionally or alternatively, surge detection criteria may be more conservative, which may increase fueling times.

In some fluid systems, such as first fluid system 20, one or more surge suppressors 200 may be used. A surge suppressor 200 may include a metal tank with an elastic bladder. A compressed gas may be disposed in the tank to pressurize the top of the bladder, and the bottom of the bladder may be connected to the fluid system 20. The compressed gas may provide the fluid system 20 with a pressure set point. During operation, as pressure builds in the fluid system 20, the bladder may push against the compressed gas, allowing system fluid 38 to flow into the tank, which may increase the volume of the fluid system 20 and decrease system pressure. Surge suppressors 200 may include surge relief limits according to the size of the tank, may be designed to be disposed as close as possible to expected surge sources, and/or may include maximum working pressures.

Figure 11:
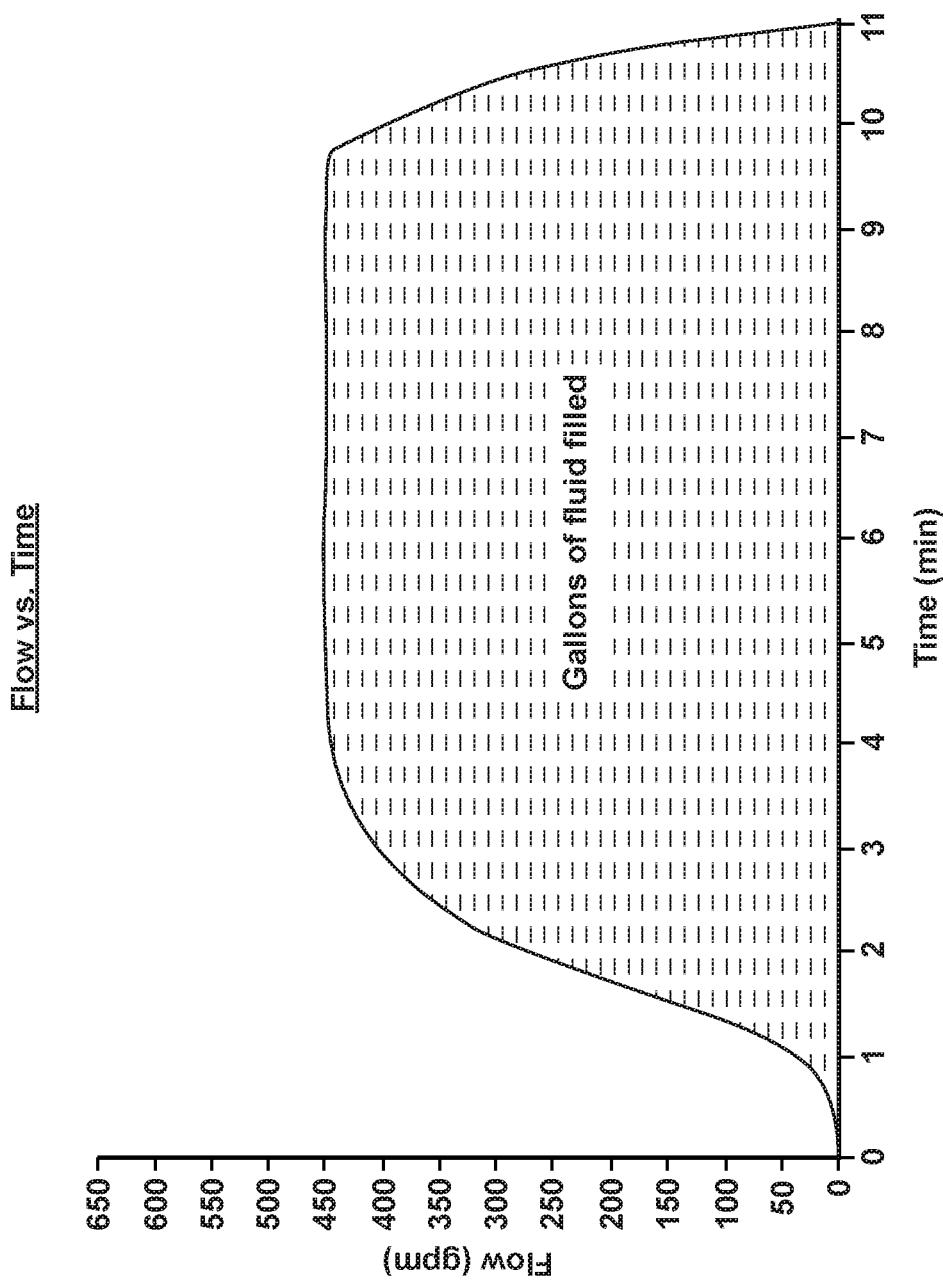
FIG. 11 is a graphical representation generally illustrating an amount of fluid in a tank relative to fueling time.
Figure 12:
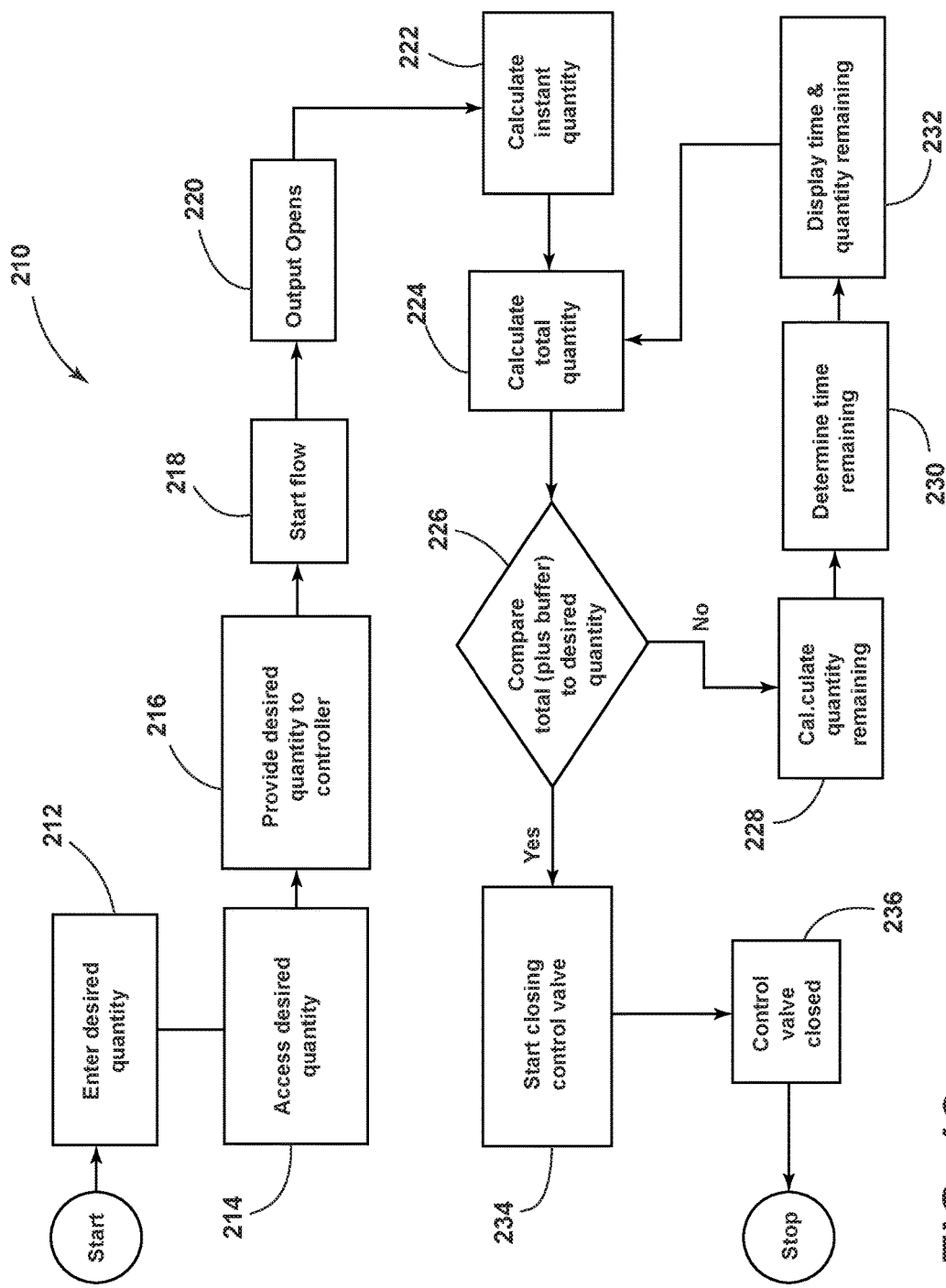
FIG. 12 is a flow diagram generally illustrating an embodiment of a method of controlling fluid flow according teachings or aspects of the present disclosure.

In embodiments, such as generally illustrated in FIGS. 9, 11, and 12, a second fluid system 120 may be configured to limit the effects of closing the fluid output/aircraft manifold 36 and/or surges, such as surges associated with closing an aircraft manifold. As generally illustrated in FIG. 12, a method 210 of controlling fluid flow may include a desired quantity of fluid being received, such as at an external controller 240 (e.g., an aircraft controller) (step 212). The desired quantity of fluid may be obtained from an aircraft (step 214) and/or may be provided to a controller (step 216). Fluid flow (e.g., refueling) may start (step 218) and the fluid output/aircraft manifold 36 may open to receive fuel (step 220). During refueling, the controller 130 may calculate (e.g., determine, estimate, etc.) an instantaneous quantity of fuel delivered (step 222) and/or a total quantity of fuel delivered (step 224). The controller 130 may compare the calculated delivered quantity with the desired delivered quantity (step 226). In some circumstances, a buffer quantity of fluid may be included, which may compensate for delayed response times, valve reaction time, and/or other expected delays. For example, and without limitation, the buffer quantity may be added to the calculated delivered quantity and then compared to the desired delivered quantity. If the calculated delivered quantity (plus a buffer quantity, if any) is less than the desired delivered quantity, refueling may continue. The controller 130 may calculate a quantity of fuel remaining to be delivered (step 228), may estimate a time to deliver the remaining fuel (step 230), and/or may display a quantity of fuel delivered and/or a time for completion on a display (step 232). The method 210 may then return to calculating a total quantity of fuel delivered (step 224).

In embodiments, if the calculated delivered quantity (plus a buffer quantity, if any) is about equal to or greater than the desired delivered quantity, the fluid system 120 and/or the controller 130 may be configured to start at least gradually closing the control valve(s) 22 (e.g., at a time 202, which may be before time 196) to gradually reduce fluid velocity and/or flow rate, which may reduce the effects of a surge (step 234). The controller 130 may continue to close the control valve 22 until it is completely closed (step 236). Starting to close the control valve at an earlier time (e.g., time 202) may limit a maximum or surge pressure (e.g., pressure maximum $P_{max2}$) experienced by the fluid system 120 relative to a certain/set pressure 144, even if complete valve closure occurs at or about the same time as first fluid system 20 (e.g., time 198).

In embodiments, a fluid system (e.g., second fluid system 120) may be configured to communicate with an aircraft controller 240 (and/or a tank fuel level sensor) of an aircraft 42 to obtain information about how much fuel has been delivered. Additionally or alternatively, the fluid system controller 130 may communicate with the aircraft controller 240 such that the aircraft controller 240 provides an indication to the fluid system controller 130 of when the fluid output/aircraft manifold 36 will be and/or is being closed. In response to the indication, the fluid system controller 130 may at least begin to close the fluid system control valve(s) 22. One or more of the above methods may limit the effects of and/or prevent surges, which may allow for components of a fluid system 120 to be lighter and/or may render surge suppressors superfluous (e.g., a fluid system 120 may not include any surge suppressors 200).

In embodiments, a fluid system 120 may include one or more safety features. For example, and without limitation, a fluid system 120 may include built-in-test (BIT) functionality, control chamber pressure may be used to detect leaks on valve seals, a pressure transducer 132 may be connected to the control fluid source 46 (e.g., an accumulator) to detect a leak or degraded performance of the control fluid source 46, and/or trends of corrective factors may be evaluated for indications of component wear.

In embodiments, some or all of the sensors (e.g., pressure sensors 32, 132, 134, 136, flow meter 34, etc.) may be in communication with and/or electrically connected to a controller 30, 130, 180 via a wired connection, a wireless connection, and/or a combination of wired and wireless connections. In embodiments, some or all of the sensors may be configured as sensors and/or transducers, and may be configured to measure, monitor, detect, and/or otherwise sense properties and/or characteristics of the fluid system 20, 120. In embodiments, the outputs of some or all of the sensors may include one or more of a variety of configurations, including, for example, being configured to output analog and/or digital signals. In embodiments with multiple controllers, the controllers may communicate with each other and/or one or more transducers or sensors wirelessly. Wireless communications may, for example, be via a single wireless channel. With embodiments, the controller(s) may be connected to a handheld device.

With embodiments, a controller 30, 130, 180 may include a set point 144. The set point 144 may be a certain fluid pressure at the fluid output 36 (e.g., at the nozzle) that should not be exceeded. A controller 30, 130, 180 may control fluid flow to minimize instances of and/or prevent exceeding the set point 144.

While fluid systems 20, 120 have been described herein in connection with fuel, fluid systems 20, 120 are not limited to use with fuel or in fueling applications.

Figure 13:
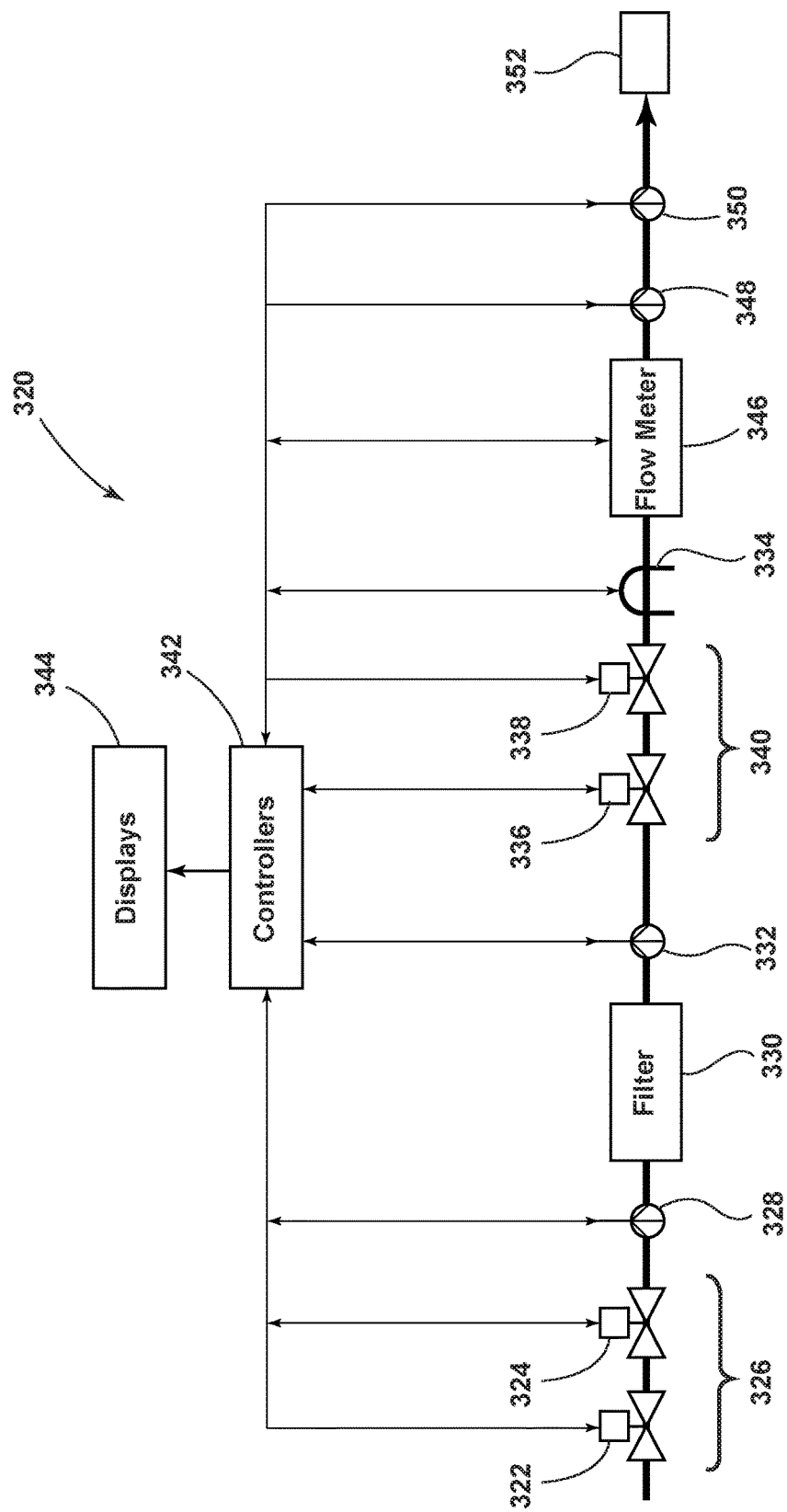
FIG. 13 is a schematic view generally illustrating an embodiment of a fluid system according to teachings of the present disclosure.
Figure 14:
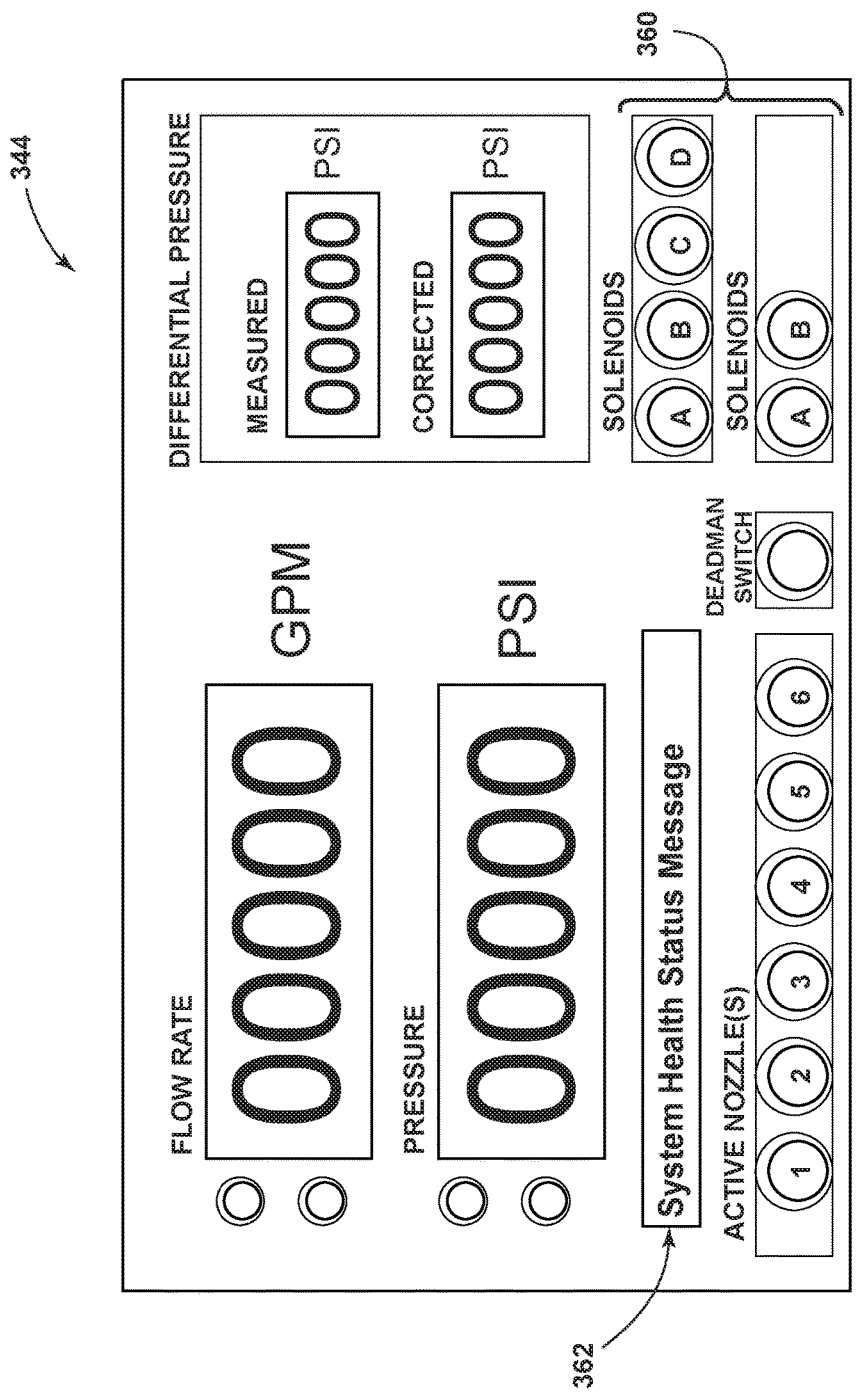
FIG. 14 is an image of a display of an embodiment of a fluid system according to teachings of the present disclosure.

In embodiments, such as generally illustrated in FIGS. 13 and 14, a fluid system 320 may include a first solenoid 322, a second solenoid 324, a first control valve 326, a first/upstream pressure sensor 328, a filter 330, a second/downstream pressure sensor 332, a fluid sensor 334 (e.g., to detect flow), a third solenoid 336, a fourth solenoid 338, a second control valve 340, a controller 342, one or more displays 344, a flow meter 346, a third pressure sensor 348, and/or a fourth pressure sensor 350. The controller 342 may be configured to control fluid flow to a fluid output 36, which may include, for example, fuel flow to an underwing nozzle of an aircraft 42. The controller 342 may be connected (e.g., electronically via wired and/or wireless connections) to one or more of the first solenoid 322, the second solenoid 324, the third solenoid 336, the fourth solenoid 338, one or more pressure sensors 328, 332, 348, 350, the fluid sensor 334, the flow meter 346, and/or the display 344. The controller 342 may control fluid flow via one or more of the solenoids 322, 324, 336, 338 that may control one or more control valves 326, 340. The controller 342 may control fluid flow according to (e.g., based on information, data, values, signals, or similar from) the one or more pressure sensors 328, 332, 348, 350, the fluid sensor 334, and/or the flow meter 346. An output of the control valve 340 may be in fluid communication with a fluid output 352 (e.g., a nozzle, a manifold, etc.).

As generally illustrated in FIG. 13, in embodiments, the controller 342 may be configured to monitor electrical current signatures of one or more solenoids 322, 324, 336, 338. The controller 342 may be configured to determine a health status of a solenoid 322, 324, 336, 338, which may include determining a number of hours in use and/or comparing the electrical current signatures to a degradation profile. A degradation profile may include an expected current signature of a solenoid relative to the usage history of the solenoid (e.g., length of time since installation, number of fueling events, number of actuations, hours used, etc.). The controller 342 may be configured to detect if the solenoid or a related component has failed (e.g., if the controller 342 detects an open or a short for a solenoid). With embodiments, such as generally illustrated in FIG. 14, the controller 342 may be configured to display an indication of a health status 360 of one or more solenoids 322, 324, 336, 338 on the display 344 (e.g., a green light for proper function, a red light for malfunction or impending malfunction). If the health status of one or more solenoids 322, 324, 336, 338 is not as desired, the controller 342 may provide an indication of some form, such as a status message 362 that repair parts should be procured and/or implemented. With embodiments, the controller 342 may include a controller associated with each solenoid 322, 324, 336, 338 and/or each set of solenoids.

Figure 15:
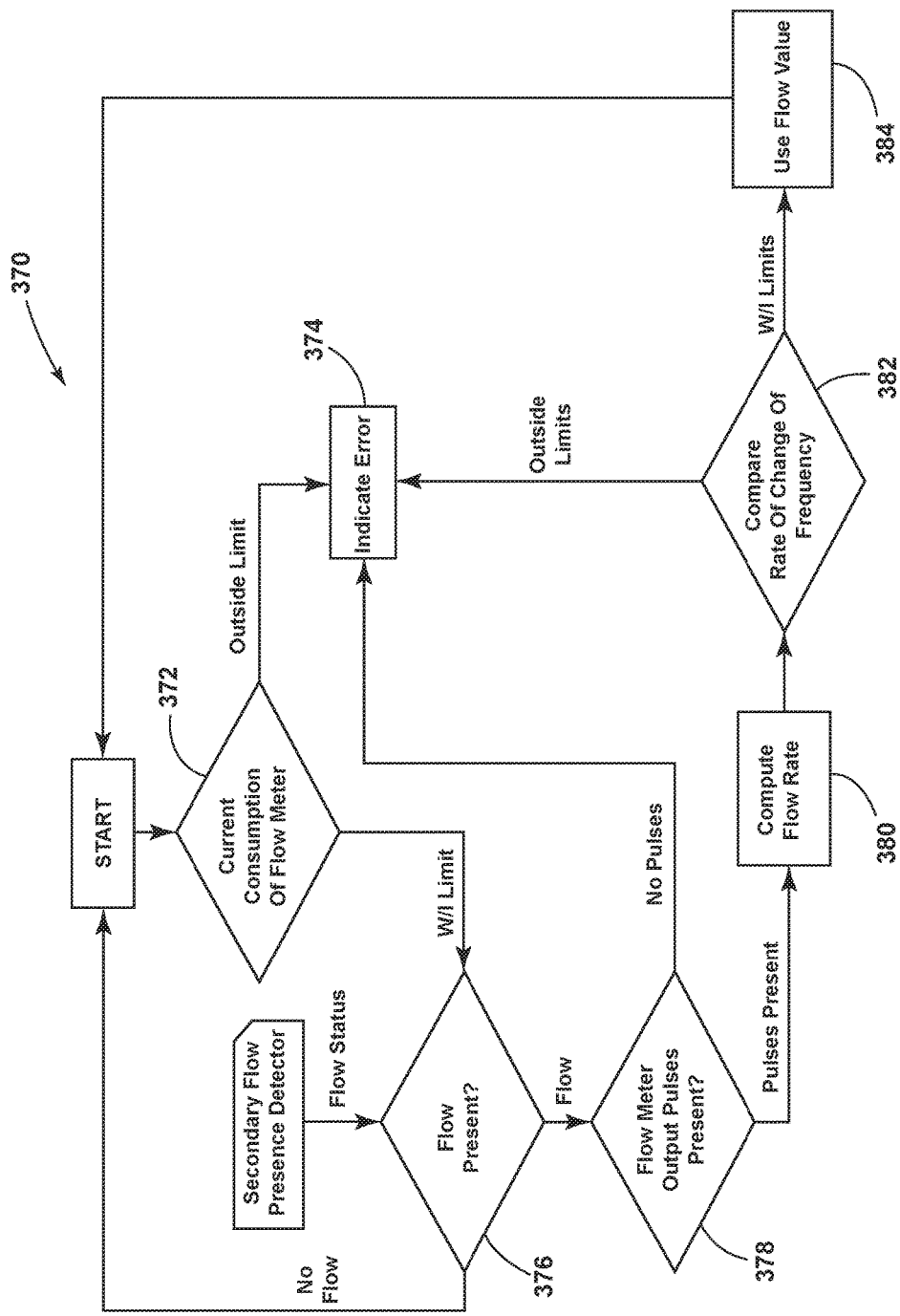
FIG. 15 is a flow diagram generally illustrating an embodiment of a method of monitoring a fluid system according teachings of the present disclosure.

In embodiments, a flow meter 34, 346 may be configured for measuring a rate of fluid flow (e.g., fuel flow) in a fluid system 20, 120, 320, which may be used in computing a fluid pressure at a remote location (e.g., at a fluid output/nozzle 36). As generally illustrated in FIG. 15, a controller 342 may be configured to monitor the health of a flow meter 346, such as via monitoring an electrical current of the flow meter 346 and/or via monitoring one or more secondary flow presence sensors (e.g., fluid sensor 334). Additionally or alternatively, a controller 342 may be configured to provide a health indication 360, such as to a display 344. A method 370 of monitoring a flow meter may include a controller 342 comparing the electrical current consumption of the flow meter 346 to a value or limit (step 372). If the current consumption is not within a current range associated with a value or limit, the controller 342 may indicate an error, such as via displaying an error light and/or message 362 (step 374). If the current consumption is within the range associated with a value or limit, the controller 342 may determine whether flow is present, such as via one or more flow presence sensors (step 376). If flow is not present, the monitoring method 370 may repeat or start over. If flow is present, the controller 342 may determine if the flow meter 346 is outputting signals/pulses (step 378). If the flow meter 346 is not outputting signals and/or not outputting signals as expected, the controller 342 may indicate an error (step 374). If the flow meter 346 is outputting signals, the controller 342 may determine a flow rate, such as via detecting a frequency of flow meter pulses at a rate of 100 ms, for example (step 380). The controller 342 may compare a rate of change of the frequency with an estimated rate of change of flow in the fluid system 120 (step 382). If the rate of change of the frequency is not with certain limits/ranges of an estimated rate of change of fluid flow, the controller may indicate an error (step 374). If the rate of change of the frequency is with certain limits/ranges, such as associated with an estimated or intended rate of change, the controller may accept the determined flow rate and/or use the determined flow rate for controlling the fluid system (step 384).

With embodiments, a controller 130, 342 may be configured to monitor a health status of a display 344. For example, and without limitation, the controller 130, 342 may determine a number of temperature cycles that the display 344 has experienced. The controller 130, 342 may use the number of temperature cycles and/or an ambient/current temperature to determine degradation of the display 344 and/or provide an indication/alarm in the event of display degradation or failure.

In embodiments, a controller (e.g., controllers 30, 130, 240, 342) may include an electronic controller and/or include an electronic processor, such as a programmable microprocessor and/or microcontroller. In embodiments, a controller may include, for example, an application specific integrated circuit (ASIC). A controller may include a central processing unit (CPU), a memory, and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

What is claimed is:

1. A fluid system, comprising:
   a controller;
   a control valve;
   a fluid manifold;
   a first solenoid connected to the fluid manifold, the control valve, and the controller;
   a second solenoid connected to the fluid manifold, the control valve, and the controller;
   a first pressure sensor in fluid communication with an output of the control valve; and
   a second pressure sensor in fluid communication with the fluid manifold;
   wherein the controller is configured to control operation of the control valve via the first solenoid and the second solenoid according to a first fluid pressure obtained via the first pressure sensor and according to a second fluid pressure obtained via the second pressure sensor; and
   the controller is configured to predict a fluid output closure according to a volume of fluid delivered, and controlling the control valve according to the predicted fluid output closure includes beginning to close the control valve prior to the fluid output closure.

2. The fluid system of claim 1, wherein the control valve includes a piston, the controller is configured to determine a position of the piston, and the controller is configured to control operation of the control valve according to the position of the piston.

3. The fluid system of claim 2, wherein the controller is configured to determine the position of the piston according to a spring constant, a spring length of a spring of the control valve, and the second fluid pressure.

4. The fluid system of claim 1, including a calibration pressure sensor connected to a fluid chamber of the control valve and configured to sense a fluid pressure in the control valve.

5. The fluid system of claim 1, including a second controller and a second control valve; wherein the controller and the second controller are configured to operate independently from each other and in conjunction with each other to control operation of the control valve and the second control valve.

6. The fluid system of claim 5, wherein the controller and the second controller are configured to monitor each other and to switch control of the control valve and the second control valve to an operating one of the controller and the second controller if the controller or the second controller malfunction.

7. The fluid system of claim 1, wherein the controller is configured to predict the fluid output closure and control the control valve according to the predicted fluid output closure.

8. The fluid system of claim 1, wherein the controller is configured to predict the fluid output closure if a sum of the volume of fluid delivered and a fluid buffer is about equal or greater than a desired fluid amount.

9. The fluid system of claim 1, including a display connected to the controller, wherein the controller is configured to determine a health of at least one of the first solenoid and the second solenoid and provide an indication of the health via the display.

10. The fluid system of claim 9, wherein the controller is configured to determine the health according to at least one of a current signature of the first solenoid and a current signature of the second solenoid.

11. The fluid system of claim 1, including a flow meter connected downstream of the control valve, wherein the controller is configured to provide an indication of an error if a current consumption of the flow meter is outside of an expected current range.

12. The fluid system of claim 11, including a flow presence sensor, wherein the controller is configured to provide the indication if the flow presence sensor senses flow and the flow meter is not providing an output or the output of the flow meter is not within an expected output range.

13. The fluid system of claim 11, wherein the controller if configured to provide the indication if a rate of change of a frequency of the flow meter is not consistent with an estimated rate of change of fluid flow.

14. The fluid system of claim 1, including a display connected to the controller; wherein the controller is configured to monitor a health of the display according to a number of temperature cycles experienced by the display and an ambient temperature.

15. The fluid system of claim 1, wherein the controller includes a flow coefficient and is configured to control the control valve according to the flow coefficient; and the flow coefficient is determined via a calibration pressure sensor connected to a fluid output.

16. The fluid system of claim 1, wherein the controller is configured to determine a deviation factor according to a difference between an expected output pressure and an actual output pressure for a modulation of at least one of the first solenoid and the second solenoid.

17. The fluid system of claim 1, wherein the controller is configured to determine health of the first solenoid according to a current signature of the first solenoid and a degradation profile.

18. The fluid system of claim 1, wherein the controller is configured to communicate with an external controller and to control the control valve according to information from the external controller.

19. The fluid system of claim 18, wherein the information includes at least one of an indication of a closing of a fluid output and a fuel level in an aircraft fuel tank.

* * * * *